H. B. GREIG.
SAFETY CONTROLLING MECHANISM FOR ELECTRICALLY PROPELLED VEHICLES.
APPLICATION FILED MAY 14, 1915.
1,171,785.   Patented Feb. 15, 1916.
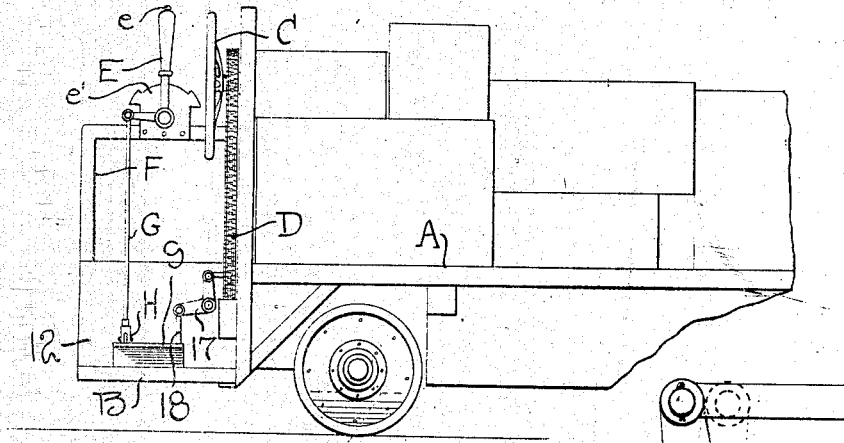
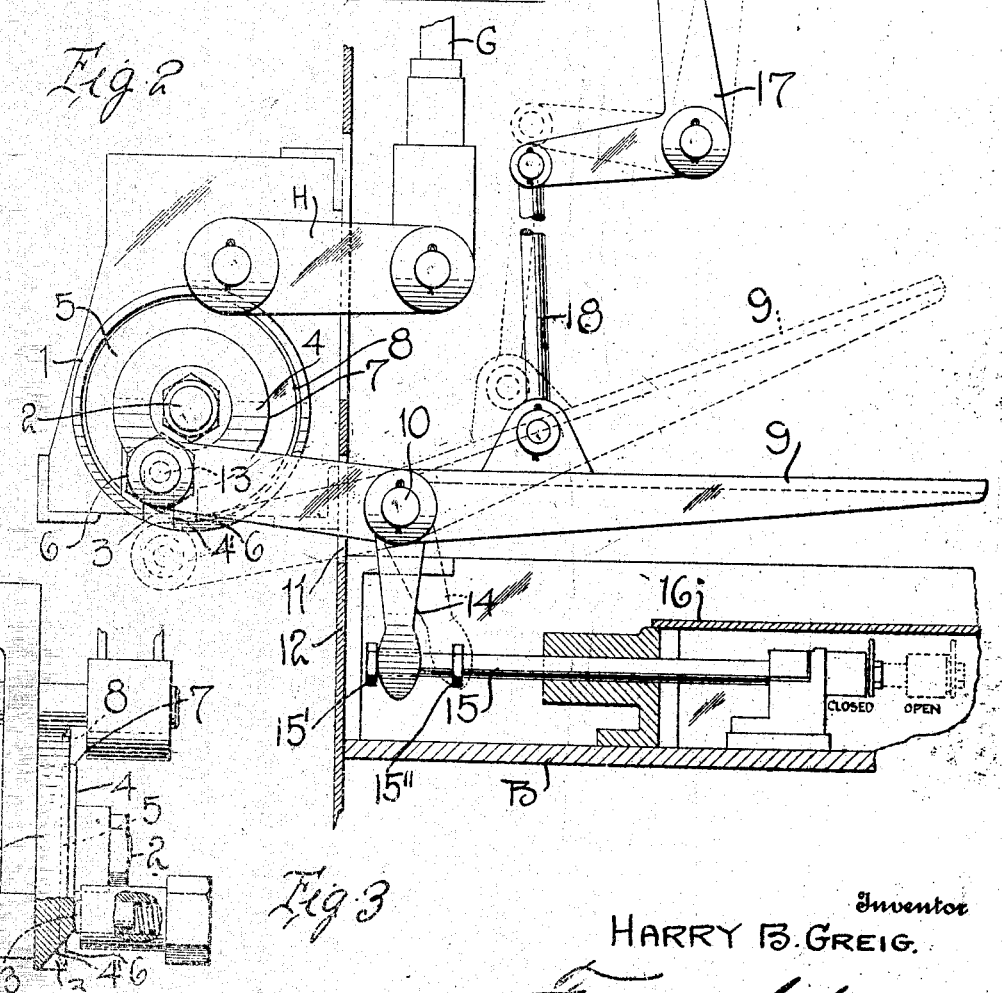
Inventor
HARRY B. GREIG.
By Frederick S. Stitt
Attorney

UNITED STATES PATENT OFFICE.

HARRY B. GREIG, OF GALION, OHIO.

SAFETY CONTROLLING MECHANISM FOR ELECTRICALLY-PROPELLED VEHICLES.

1,171,785.  Specification of Letters Patent.  Patented Feb. 15, 1916.

Application filed May 14, 1915. Serial No. 28,127.

*To all whom it may concern:*

Be it known that I, HARRY B. GREIG, a citizen of the United States, residing at Galion, in the county of Crawford and State of Ohio, have invented certain new and useful Improvements in Safety Controlling Mechanism for Electrically-Propelled Vehicles, of which the following is a specification.

This invention comprehends certain new and useful improvements in means for controlling electrically propelled vehicles, and relates particularly to an improved foot pedal latch or safety device to be used on electrical vehicles of the commercial or industrial type, although it is to be understood that the invention is not limited to such application.

The invention has for its primary object a novel and useful mechanism for controlling an electrically propelled vehicle, so constructed and arranged that the operator of the vehicle in which the appliance is used may at all times have a positive and absolute control of his machine, so that liability of an accident will be reduced to a minimum.

A further object of the invention is a safety device or apparatus of this character so arranged that the motor circuit will be maintained in closed position only so long as the operator's foot is pressed down upon the foot pedal, means being provided whereby the circuit will be instantly opened immediately upon this pressure being removed, and the parts being further arranged so that it will be impossible for the operator to subsequently close the circuit again without bringing his motor control lever back to the neutral position.

The invention also aims to provide a safety controlling mechanism of this character embodying the foot pedal hereinbefore mentioned, said pedal being so arranged in correlation to other parts of the apparatus that when the pedal is pressed down by the operator's foot, the brakes of the vehicle will be automatically moved to an inoperative position and also automatically moved to an operative position or applied, when the foot pedal is released to open the electrical circuit, the parts being further arranged in such a manner that by holding the foot pedal at an intermediate position, the brakes will be released and the vehicle allowed to coast, but subsequently, that is, after moving the foot pedal to such intermediate position, the electric power cannot be subsequently applied until the motor control lever or handle is again brought back to the neutral position. And the invention also aims to generally improve devices of this character so as to render them more useful and commercially desirable.

With these and other objects in view, as will more fully appear as the description proceeds, the invention consists in certain constructions, arrangements, and combinations of the parts that I shall hereinafter more fully describe and claim.

For a full understanding of the invention, reference is to be had to the following description and accompanying drawings in which the invention is shown as embodied in an electrically propelled baggage truck for use around docks, railway stations and the like, and of the type in the use of which the operator stands upon a platform or ledge at the end of the truck, although it is to be understood that the invention is not limited to this type of vehicle, but is applicable to electrically propelled vehicles or trucks generally, although especially designed for electrical, commercial or industrial vehicles or trucks.

In the drawings:—Figure 1 is a side elevation of a portion of a loaded baggage truck embodying the improvements of my invention. Fig. 2 is an enlarged side elevation with parts in section, the bell-crank designed to operate the brakes, being shown at right angles to its true position for the purpose of illustration, and Fig. 3 is a detail view partly in section, of the latch, and the disk carried by the controller shaft, with which the latch co-acts, as will be hereinafter more fully described.

Corresponding and like parts are referred to in the following description and designated in all of the views of the accompanying drawings by like reference characters.

In the accompanying drawings, only so much of the vehicle is shown as is necessary to obtain a full understanding of the features that comprise my present invention, A designating the bed or body portion of the vehicle, B the platform at one end thereof upon which the operator stands, and C the steering wheel designed to operate through the instrumentality of the chain D.

E designates the motor controller handle provided with a spring pressed latch $e$ designed for engagement with the notched vertically disposed sector $e'$ that is mounted upon the bracket F, and G designates the link rod which is pivotally connected at its upper end to the bell crank arm of the lever or handle E and at its lower end to the lever H operatively connected (by means not shown) to the motor controller. In the present embodiment of the invention, the parts are so arranged that when the handle E is in an upright position, the controller is at "neutral."

In carrying out my invention, a disk 1 is secured to one end of the controller shaft 2, said disk, as clearly illustrated in Fig. 2, being formed at one point with a recess 3 extending from the outer edge or margin thereof inwardly and having an inwardly inclined wall 4', as best illustrated in Fig. 3, which opens at its high or inner end upon a flat annular surface 4 surrounding the hub of the disk. The disk 1 is further provided in its outer face with an annular groove 5 which surrounds the flat bearing surface 4 and is concentric thereto, the recess 3 intersecting or dividing said groove, as clearly illustrated in the drawings, and being separated therefrom by cam surfaces 6 that define both sides of the recess. These cam surfaces are inclined in a circumferential direction from the ends of the groove to the side walls of the recess 3 which they define.

Preferably the inner wall of the groove 5 which separates it from the flat bearing surface 4, is comparatively abrupt, as indicated at 7, while the outer edge or wall of said groove is beveled or inclined radially, as indicated at 8.

Co-acting with the disk 1 is a foot pedal 9. This is pivotally mounted intermediate of its ends upon a shaft 10, and one end projects out over the platform B whereby it will be within convenient reach of the operator's foot, while the other end projects inwardly toward the controller through an opening 11 formed in a backing-plate 12 and is provided at its inner end with a spring-pressed latch 13 in the form of a pin having a substantially flat end adapted to bear against the disk 1. It is to be particularly noted that the latch 13 can only pass the edge of the disk 1 by moving through the inclined recess 3 so as to reach the flat bearing surface 4, and that when the recess 3 is in registry with the latch 13, then the control lever or handle is at neutral. A switch lever 14 is also carried by the shaft 10, and extends downwardly therefrom, said switch lever being movable by and upon the movement of the pedal 9 and being operatively connected to a switch rod 15 so as to open and close the switch within the box 16. In the full-line position of the parts shown in Fig. 2, the switch is shown as engaged whereby the motor circuit is closed, and in dotted lines the position of the switch is indicated as dis-engaged, whereby the motor circuit is opened. Also operatively connected to the foot pedal 9 is a bell-crank 17, this connection in the present instance consisting of a link rod 18, said bell crank being operatively connected to the brakes (not shown), and springs being employed (the same being also omitted as unnecessary to a full disclosure of this invention), whereby when the foot pedal 9 is released, the brakes will be automatically set, and when the foot pedal is pressed down by the foot of the operator, the bell-crank will be rocked to the full-line position illustrated in Fig. 2, and the brakes released and held released against the tension of the springs.

In describing the practical operation of an electrically propelled vehicle equipped with the improvements of my invention, I will assume in the first place, that the vehicle is at a standstill, the foot pedal being in the dotted-line position illustrated in Fig. 2, and the brakes being, therefore, set. In order to start the vehicle and before the brakes can be released, it is necessary that the operator move the controller handle to the neutral position so as to bring the recess 3 in registry with the latch 13, whereupon the operator will press his foot downward upon the pedal 9, which will release the brakes and simultaneously close the motor circuit, while at the same time the latch 13 will have moved inwardly through the recess 3 so as to rest upon the bearing surface 4, then as is manifest the operator can move the controller handle in either way according to the direction it is desired the vehicle shall take, the end of the latch 13 sliding over the smooth flat surface 4. When it is desired to bring the vehicle to a standstill, it is only necessary for the operator to remove his foot from the pedal 9 whereupon the switch will be instantly moved in a direction to open the circuit, no matter what the position of the controller might be at that time, and the brakes will be instantly set; and, it will be particularly borne in mind in this connection, thereafter it will be impossible for the operator to again close the circuit and release the brakes until the controller shall have been moved back to neutral so as to bring the recess 3 in line with the latch pin 13.

Should the operator desire to allow the vehicle to coast by cutting off the power but not applying the brakes, he can easily do so by allowing the pedal 9 to rise to an intermediate position so as to allow the latch 13 to move into the groove 5, this movement being capable of operation with the controller at any position, it being, of course, understood that so long as the latch 13 is in registry with and mounted in the groove 5, the motor circuit will be opened but the brakes will not be set. Then, if it is again desired to apply the power before setting the brakes and bringing the vehicle to a standstill, it is only necessary to move the controller handle back to neutral position, which will cause the latch 13 to ride over the cam surfaces 6 into the recess 3 so that the operator can fully depress the pedal and bring the latch back again to the flat bearing surface 4, which movement of the pedal will obviously close the circuit and at the same time permit the controller handle to be moved as desired so as to control the speed and direction of movement.

It is to be particularly noted (see Fig. 2), that the switch rods 15 have two nuts 15' and 15'' mounted thereon, these nuts being arranged in spaced relation to each other. By this arrangement of the parts, the switch lever 14 is allowed some play or lost motion, whereby should the operator raise his foot slightly and let the pedal 9 rise a short distance as, for example, in going over rough roads, the connection would not be thereby broken, until the lever 14 strikes the nut 15' and allows the latch 13 to drop into the groove or recess 5. Thus, all accidental making and breaking of the electrical connections is avoided and the liability of burning the contacts precluded.

It will thus be seen that I have provided a very efficient safety apparatus for controlling electricity propelled vehicles, and that by the use of an apparatus of this character the operator will at all times have complete and positive control of his machine.

While the accompanying drawings illustrate what I believe to be the preferred embodiment of my invention, it is to be understood that the invention is not limited thereto but that various changes may be made in the construction, arrangements and proportions of the parts without departing from the scope of the invention as defined in the appended claims.

What is claimed, is:

1. In an electrically propelled vehicle, a motor controller, brake actuating means, a pedal, means tending to move the pedal to raised position, a circuit controlling switch, operative connections between the brake actuating means, the said switch, and the pedal arranged to release the brakes and close the circuit by and upon the movement of the pedal to depressed position, a disk carried by the controller shaft and formed with a flat bearing surface and a beveled recess leading thereto, and a spring-pressed latch carried by the pedal and movable through said recess onto said bearing surface, the disk being disposed on the shaft in such position that said recess will register with the latch when the controller is in neutral position.

2. In an electrically propelled vehicle, a motor controller, a pedal, a circuit controlling switch and brake actuating means operable by the pedal, a spring-pressed latch carried by the pedal, and a disk carried by the controller shaft, said disk being formed with a flat bearing surface, with a beveled recess leading from its outer edge inwardly to said surface and designed to register with the latch when the controller is in neutral position, and with a curved groove concentric to and surrounding the flat bearing surface and stopping on each side of said recess.

3. In an electrically propelled vehicle, a motor controller, a pedal, a circuit controlling switch and brake actuating means operable by the pedal, a spring-pressed latch carried by the pedal, and a disk carried by the controller shaft, said disk being formed with a flat bearing surface, with a beveled recess leading from its outer edge inwardly to said surface and designed to register with the latch when the controller is in neutral position, and with a curved groove concentric to and surrounding the flat bearing surface and stopping on each side of said recess, the inner wall of said groove being abrupt and the outer wall being inclined toward the edge of the disk.

4. In an electrically propelled vehicle, a motor controller, a pedal, brake actuating means, a circuit controlling switch operatively connected to said pedal, a latch carried by said pedal, and a disk carried by the controller shaft, said disk being formed with a flat bearing surface, with a beveled recess leading from its outer edge to said surface and designed to register with said latch when the controller is in neutral position, and with a curved groove surrounding and concentric to said bearing surface, the inner wall of said groove being abrupt and the outer wall being inclined toward the edge of the disk, the ends of said groove terminating on opposite sides of the recess and the disk being formed at such point with cam surfaces inclined circumferentially from the ends of the groove to the side walls of the recess.

5. In an electrically propelled vehicle, a motor controller, brake actuating means including a bell-crank, a circuit controlling switch, a pedal pivotally supported intermediate of its ends and having a link connection with one arm of said bell-crank, a switch lever operatively connected to said switch and movable by the pedal, a spring-pressed latch carried by the inner end of the pedal, and a disk carried by the controller shaft, said disk being formed around said shaft with a flat bearing surface and being also formed with an inclined recess leading from its outer edge to said surface and adapted to register with the latch when the motor controller is in neutral position, the disk being further formed with a curved groove surrounding and concentric to said flat surface and terminating on opposite sides of said recess, the ends of the groove terminating in circumferentially inclined cam surfaces terminating at their highest points in the side walls of the recess.

6. In an electrically propelled vehicle, a motor controller, a circuit controlling switch including a switch rod, a pedal, a switch lever operable by the pedal, nuts disposed in spaced relation to each other on the switch rod and the switch lever having play between said nuts and adapted to engage same to move the switch rod, and means operatively connected to the pedal for moving the switch to closed position only upon the previous movement of the motor controller to neutral position.

In testimony whereof I affix my signature in presence of two witnesses.

HARRY B. GREIG.

Witnesses:
GARDA HOLMES,
FRANK B. STIMSON.